UNITED STATES PATENT OFFICE.

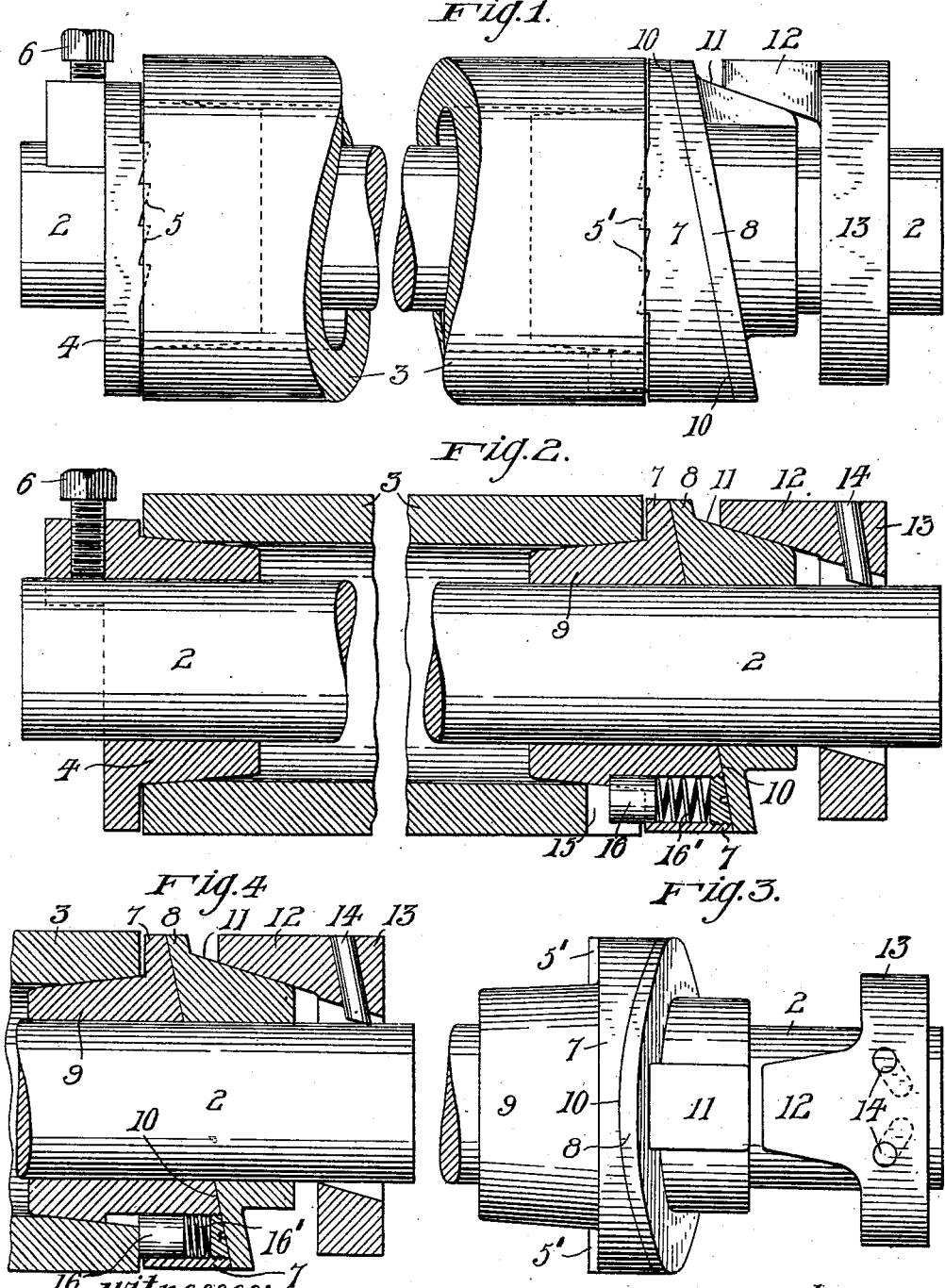

DANIEL B. DONNELLY, OF PITTSBURG, PENNSYLVANIA.

LOCKING-CHUCK FOR PAPER-ROLL SPINDLES.

969,529.  Specification of Letters Patent. Patented Sept. 6, 1910.

Application filed August 14, 1909. Serial No. 512,881.

*To all whom it may concern:*

Be it known that I, DANIEL B. DONNELLY, a resident of Pittsburg, in the county of Allegheny and State of Pennsylvania, have invented certain new and useful Improvements in Locking-Chucks for Paper-Roll Spindles, of which the following is a specification.

The object of this invention is to provide an efficient chuck for centering and securing a roll of paper on the roll spindle of a printing press, one which may be readily applied and removed, and which when in place holds the roll absolutely secure.

In the accompanying drawings, Figure 1 is a broken elevation of a roll core and spindle showing the improvement applied thereto, and Fig. 2 is a longitudinal section. Fig. 3 is an elevation of the chuck parts detached. Fig. 4 is a section showing the chuck applied to an unslotted roll core.

Referring to the drawings, 2 designates the roll spindle of a printing press and 3 the core of a roll of paper. One end of the core is centered and secured by cone 4, shouldered at the outer extremity of the core, with the shoulder formed with a series of ratchet-like teeth 5. The cone may be secured by set screw 6. The foregoing is what may be termed the fixed cone, and the invention relates primarily to the movable or adjustable cone or chuck device for the opposite end, although teeth 5 of cone 4 comprise a novel element, as will presently appear. The holding means for the other end of the core consists of two chuck members 7 and 8, the former having the cone-like extension 9 which enters the extremity of the core. Members 7 and 8 may when loose be rotated on spindle 2, and are formed with diagonal or cam-like meeting faces, indicated by line 10. Member 8 is formed with the outwardly sloping wedging face 11 which is adapted to be engaged by a similar face of lug 12 which projects laterally from the ring-like spindle-embracing clamp 13. The latter carries pins 14 which project slightly into the ring bore, with their inner extremities so disposed as to bite into the spindle when the chuck is in place, as in Figs. 1 and 2, and thus hold the parts in position. Pins 14 are preferably located adjacent lug 12.

In operation, the roll is mounted on the spindle and one end thereof fixed on cone 4. Cone part 7 is then pushed into place on the opposite end of the core thereby fully centering the roll. Then with part 8 bearing against part 7 with the diagonal faces engaging, cam ring 13 is forced inward as far as lug 12 riding on wedging surface 11 will permit, and this wedging action tilts the ring and causes pins 14 to bite or impinge the spindle, thereby securing a most effective cramping hold. Any tendency of part 7 to move with relation to part 8 is opposed by the diagonal engaging faces which will simply tend to increase the wedging and holding action. However, any loosening tendency will exert outward pressure on member 8 in line with the axis on spindle 2 and cannot tend to displace or loosen the hold of clamping ring 13.

It is a common practice to form one end of a roll core with a slot 15 to receive a projection on the centering cone and thus interlock the parts so that neither can turn without the other. In the present invention, this feature is embodied in a backwardly pressible pin 16, movable in a depression in member 7, and held normally projected into slot-engaging position by spring 16'. This provides an effective interlock for such cores as are slotted, and for those not slotted, spring 16 is simply retracted in its depression by pressure on the end of the core and disappears entirely and is quite out of the way, as shown in Fig. 4. As a further precaution against rotation of the core on the cones, part 7 is provided with the ratchet-like teeth 5', similar to teeth 5 of cone 4 but disposed reversely thereto. These teeth impinge the extremities of the core, and being disposed in reverse directions at the opposite ends, any tendency on the part of the core to rotate in either direction will be effectively resisted by one or the other of the sets of teeth.

A further feature of the invention is the relative size of the chuck or cone heads and core, the latter being of greater external diameter than the heads. It frequently occurs that a core is shorter than the width of the paper wound thereon, and with the cone heads smaller than the core they may be entered in the ends of the roll and the cones engaged with the core ends. With the chuck heads as large or larger than the core, they cannot be so entered, and short cores cannot be effectively reached and held.

I claim:—

1. A chuck for a paper roll formed in two spindle-embracing parts, said parts having complementary diagonal faces extending around the spindle and engaging each other with one of said parts adapted to secure one end of a roll, and means for securing the other part to the spindle.

2. A chuck for a paper roll formed with inner and outer spindle-embracing parts, said parts having diagonal faces extending around the spindle and engaging each other with the inner part adapted to secure one end of a roll, a third spindle-embracing member, and means engaging the outer of the first mentioned parts and with means resulting from said engagement tilting the third member and cramping the same on the spindle.

3. A chuck for a paper roll formed with inner and outer spindle-embracing parts, said parts having diagonal faces extending around the spindle and engaging each other with the inner part adapted to secure one end of a roll, the other part having a wedging surface disposed longitudinally of the spindle, and a spindle-embracing member engaged and tilted by said wedging surface and thereby caused to impinge the spindle.

4. A chuck for a paper roll formed with inner and outer spindle-embracing parts, said parts having diagonal faces extending around the spindle and engaging each other with the inner part adapted to secure one end of a roll, the outer part having a wedging surface disposed longitudinally of the spindle, and a third spindle-embracing member having a lateral extension engaging said wedging surface and tilting the third member and cramping it on the spindle.

5. The combination of a roll-holding chuck loosely embracing the spindle, a ring-like member loosely embracing the spindle and having spindle biting portions in different planes transversely of the spindle for impinging the latter at different points, and means affording wedging action between the chuck and said member for tilting the latter and causing its biting portions to impinge the spindle.

6. A holding chuck for a paper roll adjustable longitudinally of the spindle, the chuck formed in two parts having coextensive diagonal meeting surfaces, one of said parts adapted to engage the roll, and means for securing the other part to the roll spindle.

7. A roll holding chuck for a roll spindle formed in two parts having coextensive cam-like meeting faces, one of said parts having a roll entering and centering extension, and means for securing the other part to the spindle.

8. A roll holding chuck for a roll spindle formed in two parts having coextensive cam-like meeting faces, one of the parts adapted to engage the roll, and the other part formed with a wedging surface, and a spindle-embracing device having a spindle-biting portion adapted to be maintained in engagement with the spindle by said wedging surface of the chuck part.

9. In a mounting for a paper roll, two devices adapted to be secured to the roll spindle in engagement with opposite ends of the roll core, said devices having reversely disposed core-engaging teeth.

10. In a mounting for a paper roll, two devices on the roll spindle in engagement with opposite extremities of the roll core, said devices having reversely disposed teeth for engaging the core extremity, means for securing one of said devices to the spindle, the other device provided with a wedging surface, and a spindle-embracing member having a spindle-biting portion held in engagement with the spindle by the said wedging portion.

11. A locking chuck for a paper roll formed in two ring-like parts having similar oblique end faces in engagement with each other, the inner part adapted to engage the roll, and means for holding the other part against movement on the spindle.

12. A locking chuck for a paper roll having a disappearing roll-engaging projection.

13. A locking chuck for a paper roll, in combination with a spring-actuated pin held normally projected therefrom and adapted to be projected within the chuck and out of roll-engaging position.

14. In apparatus of the character described, the combination of a spindle, a sleeve for supporting one end of a paper roll on the spindle said sleeve having on its outer end face a double cam surface sloping in opposite directions from a portion of maximum throw, and a collar fixed on the spindle and having a double cam surface a counterpart of and contacting the cam surface of the sleeve and adapted by relative rotary movement of the sleeve and spindle to move the sleeve longitudinally of the spindle.

15. In apparatus of the character described, the combination of a spindle, a sleeve for supporting one end of a paper roll on the spindle, and a collar fixed on the spindle having an end face in contact with the outer end face of said sleeve, said contacting faces being each an approximately flat surface in a plane oblique to the axis of the spindle and adapted by relative rotary movement of the sleeve and spindle to move the sleeve longitudinally of the spindle.

16. In apparatus of the character described, the combination of a spindle, a sleeve for supporting one end of a paper roll on the spindle, said sleeve having on its outer end face a double cam surface sloping in opposite directions from a portion of maximum throw, and also having an inwardly facing annular shoulder provided with teeth adapted to make non-slipping engagement with the unnotched end surface of the spool of the paper roll, and a collar fixed on the spindle having a double cam surface the counterpart of and contacting said cam surface of the sleeve and adapted by relative rotary movement of the sleeve and spindle to move the sleeve longitudinally of the spindle.

17. The combination of a spindle, a paper roll spool on the spindle, and a sleeve for supporting one end of said spool on said spindle, said sleeve having thereabout a shoulder facing toward the inner end of the sleeve, the face of said shoulder being provided with teeth adapted to make non-slipping engagement with an unnotched end surface of the spool.

18. The combination of a spindle, a paper roll spool of non-metallic material—such as paper or other fibrous material—on the spindle, and a sleeve for supporting one end of said spool on said spindle, said sleeve having thereabout a shoulder facing toward the inner end of the sleeve, the face of said shoulder being provided with teeth adapted to make non-slipping engagement with an unnotched end of the spool.

In testimony whereof I affix my signature in presence of two witnesses.

DANIEL B. DONNELLY.

Witnesses:
FRANK McC. PAINTER,
J. M. NESBIT.